US009850324B2

(12) United States Patent
Nguyen et al.

(10) Patent No.: US 9,850,324 B2
(45) Date of Patent: Dec. 26, 2017

(54) PROCESSES FOR PREPARING EPOXIDIZED POLYMERS

(71) Applicant: LANXESS Butyl Pte. Ltd, Singapore (SG)

(72) Inventors: Paul Nguyen, London (CA); Gregory J. E. Davidson, London (CA); Richard Samuel Steevensz, Corrunna (CA)

(73) Assignee: LANXESS, Inc., Sarnia, CA (US)

( * ) Notice: Subject to any disclaimer, the term of this patent is extended or adjusted under 35 U.S.C. 154(b) by 0 days.

(21) Appl. No.: 14/651,379

(22) PCT Filed: Dec. 11, 2013

(86) PCT No.: PCT/CA2013/001017
§ 371 (c)(1),
(2) Date: Jun. 11, 2015

(87) PCT Pub. No.: WO2014/089674
PCT Pub. Date: Jun. 19, 2014

(65) Prior Publication Data
US 2015/0315299 A1 Nov. 5, 2015

Related U.S. Application Data

(60) Provisional application No. 61/736,656, filed on Dec. 13, 2012.

(51) Int. Cl.
*C08C 19/06* (2006.01)
*C08K 5/134* (2006.01)
*C08F 8/08* (2006.01)

(52) U.S. Cl.
CPC .......... *C08C 19/06* (2013.01); *C08F 8/08* (2013.01); *C08K 5/134* (2013.01); *C08F 2810/50* (2013.01)

(58) Field of Classification Search
CPC ......... C08C 19/06; C08C 19/12; C08C 19/14; C08C 19/16
See application file for complete search history.

(56) References Cited

U.S. PATENT DOCUMENTS

| | | | | |
|---|---|---|---|---|
| 3,410,761 A * | 11/1968 | Slattery | ................... | C08C 19/06 203/37 |
| 3,852,253 A * | 12/1974 | Malatesta | ................. | C08F 8/26 525/332.3 |
| 3,970,608 A | 7/1976 | Furukawa et al. | | |
| 4,341,672 A * | 7/1982 | Hsieh | .................... | B60C 1/0016 523/400 |
| 5,789,512 A | 8/1998 | Fan et al. | | |
| 2007/0203306 A1 | 8/2007 | Resendes et al. | | |
| 2007/0276062 A1* | 11/2007 | Tirelli | .................... | C08C 19/06 523/400 |
| 2008/0227922 A1 | 9/2008 | Rath et al. | | |

OTHER PUBLICATIONS

Udipi, K., "Epoxidation of Styrene-Butadiene Block Polymers. I" Journal of Applied Polymer Science, vol. 23, 1979, John Wiley & Sons, pp. 3301-3309.
Cameron, G. Gordon, et al., Grafting of Chlorohydrinated Polybutadiene and Nitrile Rubbers with Poly (tetrahydrofuran), Chemical Modification of Polydienes, 1, Makromol. Chem. 184, 1983, Wiley VCH GmbH & Co KGaA, pp. 1153-1161.
Tomoi, Masao, et al., "Phase-transfer catalytic activity of phosphonium salts bound to microporous polystyrene resins by long spacer chains", Makromol. Chem. 187, 1986, Wiley VCH GmbH & Co KGaA, pp. 2753-2761.
Jian, Sigao, et al, "Catalytic Epoxidation of Polyisobutylene-co-Isoprene with Hydrogen Peroxide", Journal of Polymer Scient: Part A: Polymer Chemistry, vol. 29, 1991, John Wiley & Sons, Inc., pp. 547-553.
Usui, Yoko, et al. "Catalytic Dihydroxylation of Olefins with Hydrogen Peroxide: An Organic-Solvent—and Metal-Free System", Angew. Chem. Int. Ed. 2003, 42, Wiley VCH GmbH & Co KGaA, pp. 5623-5625.
International Search Report from International Application No. PCT/CA2013/001017, dated Feb. 28, 2014, two pages.
Supplementary European Search Report from European Application No. 13863321, dated Jul. 25, 2016, two pages.
Schulz, D.N. et al., "Recent Advances in the Chemical Modification of Unsaturated Polymers", Rubber Chemistry and Technology, American Chemical Society, Inc., vol. 55, Issue 3, Jul. 1982, pp. 809-859.
Davies, C.K.L, et al. "Strain crystallization in random copolymers produced by epoxidation of cis 1,4-polyisoprene", Polymer, vol. 24, Issue 1 Jan. 1983, Elsevier Ltd, pp. 107-113.

* cited by examiner

*Primary Examiner* — Robert C Boyle

(57) ABSTRACT

The present invention is directed to a process for preparing epoxidized polymers. The process comprises reacting an unsaturated polymer with hydrogen peroxide in the presence of a polymer support having a sulfonic acid group. The present invention is also directed to an epoxidized halogenated-polymer which comprises repeating units derived from at least one isoolefin monomer and repeating units derived from at least one diolefinic monomer, and one or more allylic halide groups and one or more oxirane functional groups in the polymer backbone.

20 Claims, 4 Drawing Sheets

PROCESSES FOR PREPARING EPOXIDIZED POLYMERS

FIELD OF THE INVENTION

The present invention relates generally to oxidation of unsaturated polymers.

BACKGROUND

Epoxidation of unsaturated polymers is well studied and has been reviewed (Rubber Chemistry and Technology, 1982, 55, 809). Epoxidation is widely used as a way to functionalize polymers by introducing oxirane groups which can be further converted to different functional groups. Peracides, particularly peracetic acid, have been used as the epoxidation agents. Peroxyformic acid has been used for the epoxidation of styrene-butadiene block copolymers (J. App. Pol. Sci. 1979, 23, 3301, & 3311). Similarly, cis-polyisoprene, butyl rubber, EPDM, and polybutadiene have been epoxidized (Polymer, 1983, 24, 107; J. Appl. Plym. Sci. Polm. Symp., 1977, 60, 47; Makromol. Chem., 1983, 184, 1153; Makromol. Chem., 1986, 187, 2761).

Functionalization of polyisobutylene-co-isoprene (butyl rubber) is of great interest due to its potential applications in technology areas such as surface modification, adhesion, drug delivery, compatibilization of polymer blends, and motor oil and fuel additives, and in providing clean cured products without contaminant leaching and/or side products.

Journal of Polymer Science: Part A: Polymer Chemistry, Vol. 29, 547-553 (1991) reports the biphasic epoxidation of polyisobutylene-co-isoprene (butyl rubber) using $H_2O_2$ with a catalytic amount of methyltrioctylammonium tetrakis (diperoxotungsto)phosphate.

U.S. Pat. No. 5,789,512 covers a solution process for epoxidizing unsaturated polymers comprising reacting an unsaturated polymer with hydrogen peroxide in the presence of (a) tungstic acid or its metal salts, (b) phosphoric acid or its metal salts, and (c) at least one phase transfer catalyst.

WO2005063821A1 covers a solid-state process for producing an epoxidized elastomeric polymer comprising of feeding at least one elastomeric polymer containing ethylenic unsaturations to a mixing device, at least one hydrogen peroxide precursor, and at least one carboxylic acid or a derivative thereof and mixing and reacting in the presence of water.

US20080227922A1 describes a solution process for epoxidizing an ethylenically unsaturated isobutene polymer, in which an organic phase comprising the isobutene polymer is contacted with an aqueous phase which comprises formic acid and hydrogen peroxide. The process affords essentially quantitative conversions after short reaction time.

Conventional synthetic routes generate chemical wastes such as formic acid or metachlorobenzoic acid which have to be removed from the product and disposed of.

US 20050096480, and Angew. Chem. Int. Ed. 2003, 42, 5623-5625 entail a process for producing a 1,2-diol through reaction of an olefin with hydrogen peroxide in the presence of a polymer containing sulfo group. This disclosure is directed to small organic molecules, and does not provide any disclosure, teaching or suggestion that this process can be effective on elastomers.

The need exists for development of a method or process capable of producing epoxidized polymers with high efficiency by simple operation and/or by use of catalysts that can be recovered and reused.

SUMMARY OF THE INVENTION

It is an object of the present invention is to provide a process for preparing an epoxidized polymer. The process comprises reacting an unsaturated polymer with hydrogen peroxide in the presence of a polymer support having a sulfonic acid group.

In an aspect of the present invention there is provided an epoxidized halogenated-polymer comprising:
 a) repeating units derived from at least one isoolefin monomer;
 b) repeating units derived from at least one diolefinic monomer,
 wherein the epoxidized halogenated-polymer comprises one or more allylic halide groups and one or more oxirane functional groups in the polymer backbone.

DETAILED DESCRIPTION

Figure 1:
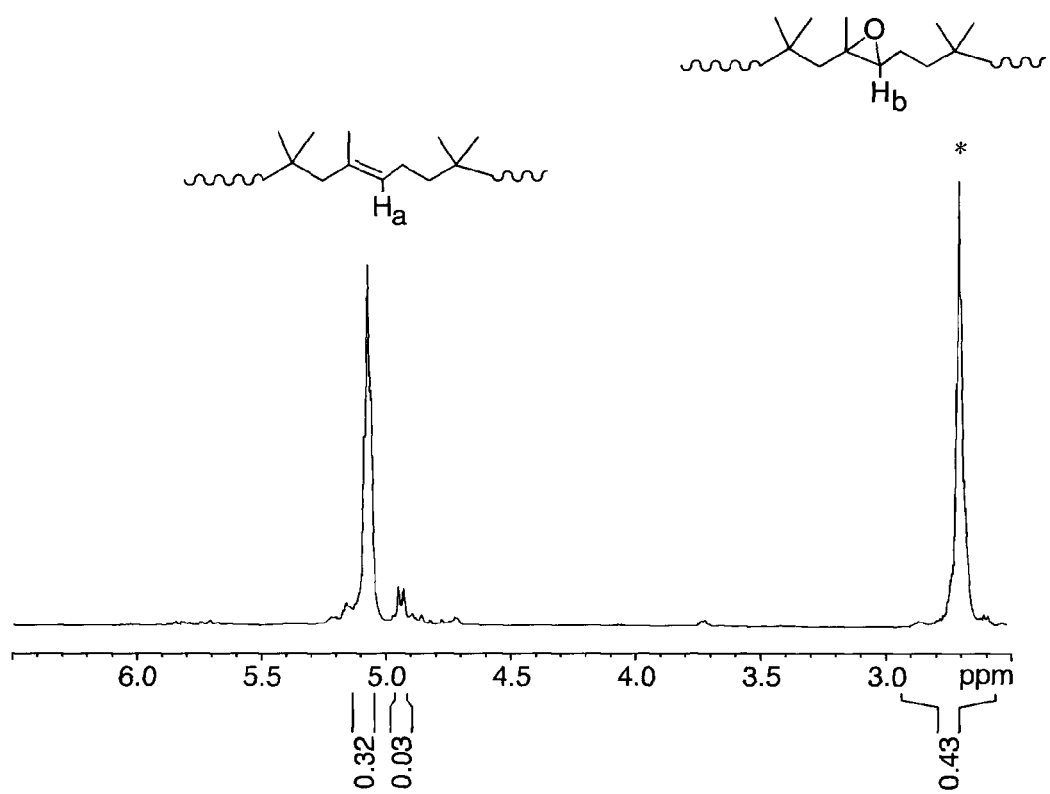
FIG. 1 shows a $^1$H NMR spectrum of epoxidized high isoprene butyl rubber (7.46 mol % unsaturation)
Figure 2:
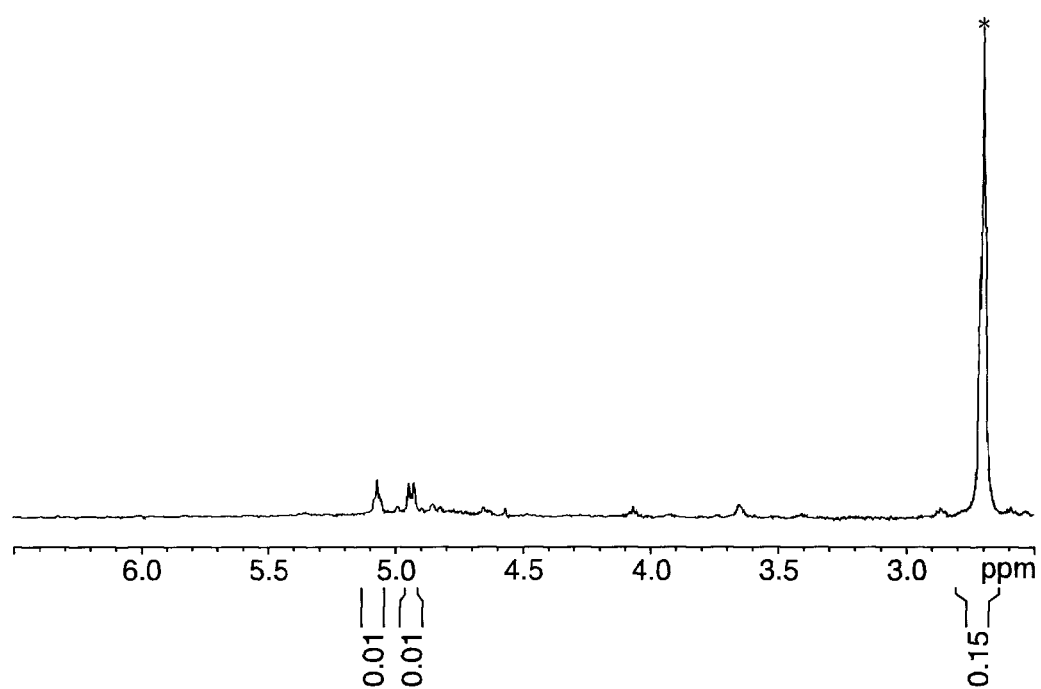
FIG. 2 shows a $^1$H NMR spectrum of epoxidized LANXESS Butyl RB301.
Figure 3:
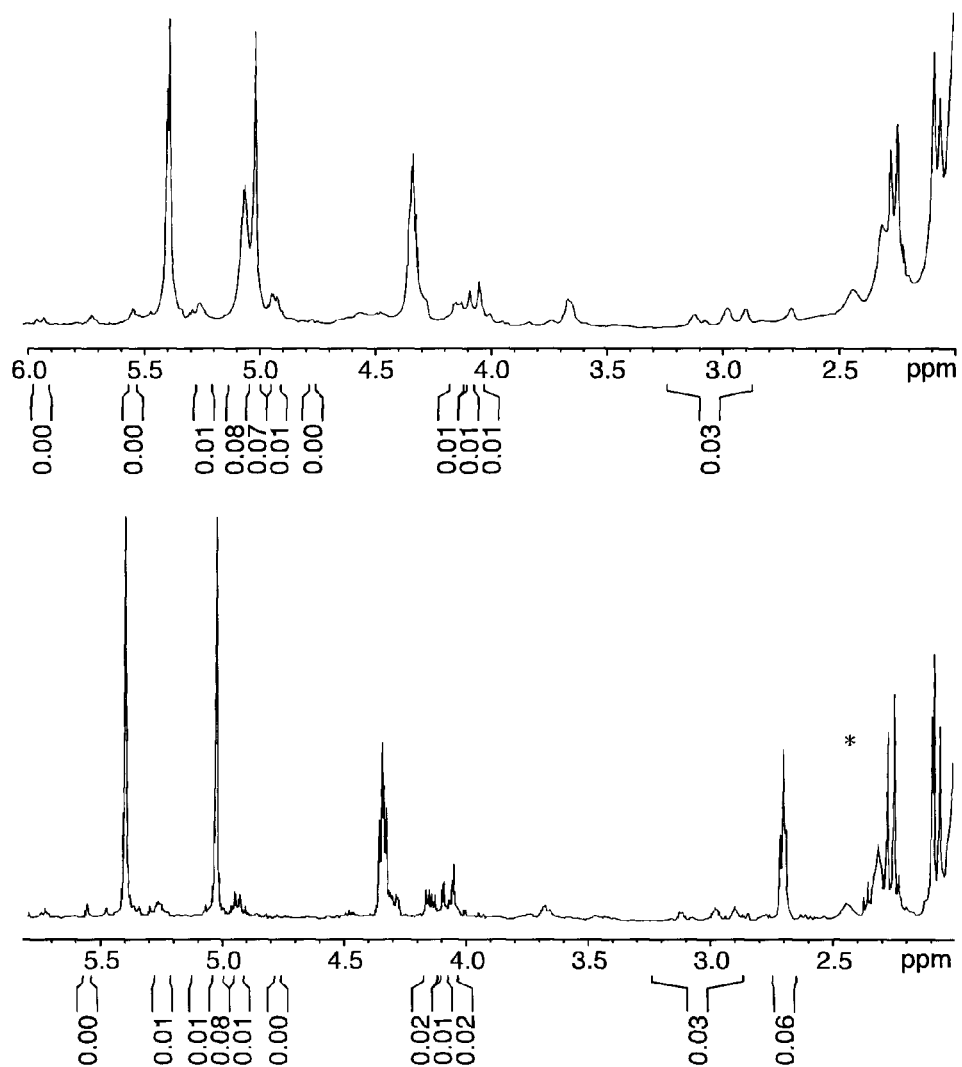
FIG. 3 shows a $^1$H NMR spectra of LANXESS Bromobutyl 2030 before and after epoxidation.
Figure 4:
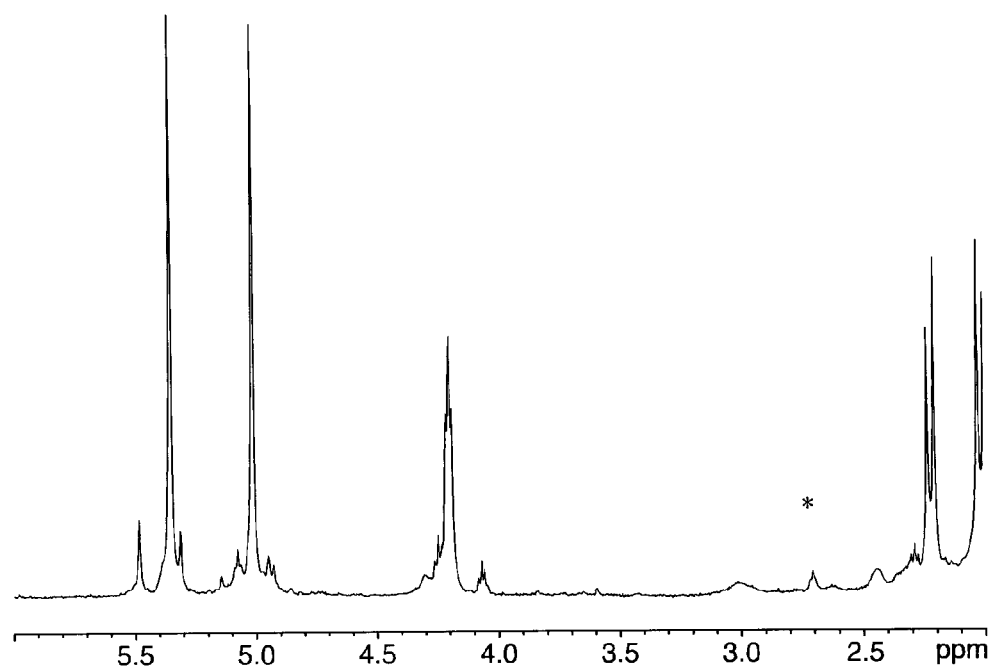
FIG. 4 shows a $^1$H NMR spectrum of epoxidized LANXESS Chlorobutyl 1240.

The present invention relates to a process for preparing epoxidized polymers. The process comprises reacting an unsaturated polymer, with hydrogen peroxide in the presence of a polymer support having a sulfonic acid group.

Unsaturated Polymer

The unsaturated polymers used in the process of the present invention comprise ethylenic unsaturations. The ethylenic unsaturations may be either in the main chain, or in the side chain of the unsaturated polymer, or in both the side chain and the main chain.

In one embodiment, the unsaturated polymer may be selected from diene homopolymers or copolymers. These polymers or copolymers may be of natural origin or may be obtained by solution polymerization, emulsion polymerization or gas-phase polymerization of one or more conjugated diolefins, optionally with at least one co-monomer selected from monovinylarenes and/or polar co-monomers, these can have a random, block, grafted or mixed structure.

The conjugated diolefins generally contain from 4 to 12, preferably from 4 to 8, carbon atoms. Non-limiting examples of conjugated diolefins are 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

Monovinylarenes which can optionally be used as co-monomers generally contain from 8 to 20, preferably from 8 to 12, carbon atoms. Non limiting examples of monovinylarene co-monomers are styrene, 1-vinylnaphthalene, 2-vinyl-naphthalene, various C1-C6 alkyl, C3-C8 cycloalkyl, C6-C10 aryl, (C1-C6)alkyl(C6-C10)aryl or (C6-C10)aryl(C1-C6) alkyl derivatives of styrene, for example: α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl) styrene, or mixtures thereof. In one embodiment, the monovinylarene is styrene.

These monovinylarenes can optionally be substituted with one or more functional groups, such as C1-C6 alkoxy groups, for example 4-methoxystyrene.

Polar co-monomers can be selected from vinylpyridine, vinylquinoline, acrylic and alkylacrylic acid esters, nitriles, or mixtures thereof, for example, methyl acrylate, ethyl acrylate, methyl methacrylate, ethyl methacrylate, acrylonitrile, or mixtures thereof.

In one embodiment, the unsaturated polymers useful in the present invention are selected, for example, from: cis-1,4-polyisoprene (natural or synthetic), 3,4-polyisoprene, polybutadiene, halogenated isoprene/isobutene copolymers, halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

In one embodiment, the unsaturated polymer useful in the present invention is natural rubber, polybutadiene, styrene/1,3-butadiene copolymers, 1,3-butadiene/acrylonitrile copolymers or mixtures thereof.

In one embodiment, the unsaturated polymer comprising ethylenic unsaturations is selected from elastomeric polymers of one or more monoolefins with an olefinic co-monomer and at least one diene, or derivatives thereof. The monoolefins can be selected from: ethylene and α-olefins generally containing from 3 to 12 carbon atoms, for example, propylene, 1-butene, 1-pentene, 1-hexene, 1-octene, isobutene or mixtures thereof.

In one embodiment, the unsaturated polymer comprises copolymers of ethylene and of an α-olefin and at least one diene, isobutene homopolymers or copolymers thereof with small amounts of a diene, which may be at least partially halogenated. The diene generally contains from 4 to 20 carbon atoms. Non limiting examples of such dienes are 1,3-butadiene, isoprene, 1,4-hexadiene, 1,4-cyclohexadiene, 5-ethylidene-2-norbornene, 5-methylene-2-norbornene, vinylnorbornene, or mixtures thereof.

In one embodiment, the unsaturated polymer is ethylene/propylene/diene copolymer (EPDM), polyisobutene or mixtures thereof.

In one embodiment, the unsaturated polymer used in the process of the present invention is at least one copolymer comprising repeating units derived from at least one C4-C8 isoolefin and repeating units derived from at least one C4-C16 conjugated diolefin, or halo derivatives of such copolymers.

The isoolefin repeating units of the copolymers of the present inventions are hydrocarbon monomers having about 4 to about 10 carbon atoms. Illustrative non-limiting examples of these isoolefins are isobutylene, 2-methyl-1-butene, 3-methyl-1-butene, 2-methyl-2-butene, 4-methyl-1-pentene, 2-methyl-1-pentene, etc. In one embodiment, the isoolefin is isobutylene.

In one embodiment, the conjugated diolefin repeating units of the copolymers of the presently claimed invention are represented by a general formula:

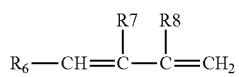

wherein R6 is a hydrogen atom or an alkyl group containing in the range from 1 to 4 carbon atoms and wherein R7 and R8 can be the same or different and are selected from the group consisting of hydrogen atoms and alkyl groups containing in the range from 1 to 4 carbon atoms.

In one embodiment of the above formula, one of R7 and R8 is other than H.

Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like.

In one embodiment, the conjugated diolefins incorporated in the copolymer of the present invention have 4 to 8 carbon atoms.

In one embodiment, the conjugated diolefin is isoprene.

In one embodiment, the unsaturated copolymer used in the present invention is butyl rubber, halo derivative of butyl rubber (halo butyl rubber) or mixtures thereof.

Halobutyl rubber can be prepared by halogenation processes described in, for example, Ullmann's Encyclopedia of Industrial Chemistry ($5^{th}$ completely revised Ed., edited by Elvers, et al., volume A231) and Rubber Technology ($3^{rd}$ Ed., edited by Maurice Morton, Chapter 10, particularly pp. 297-300) (Van Nostrand Reinhold Company© 1987). A further example is provided in Canadian Patent Application No. 2,575,652 entitled "Method of Halogenating Butyl Rubber Without Acid Neutralization Agents", which is incorporated herein by reference in its entirety.

In one embodiment, the unsaturated polymer has about 0.1 mol % to about 15 mol % unsaturation. In one embodiment, the unsaturated polymer has about 0.5 mol % to about 10 mol % unsaturation. In one embodiment, the unsaturated polymer has about 0.9 mol % to about 2.5 mol % unsaturation.

In one embodiment, the butyl rubber is LANXESS Butyl 301 comprising 1.85 mol % unsaturation. In one embodiment, the butyl rubber is high isoprene butyl rubber comprising 7.46 mol % unsaturation.

In one embodiment, the halo butyl rubber is LANXESS Bromobutyl BB32030 comprising 0.72 mol % unsaturation. In one embodiment the halo butyl rubber is LANXESS Chlorobutyl 1240 comprising 0.57 mol % unsaturation.

Polymer Support

The process of the invention is carried out in the presence of a polymer support having a sulfonic acid group. In one embodiment, the polymer support is a polymer compound such as, but not limited to, styrene polymers, styrene-divinylbenzene copolymers, and fluorocarbon resins. In general, styrene polymers, styrene-divinylbenzene copolymers, and fluorocarbon resins, which have a side chain comprising a sulfonic acid group, are industrially available. Commercially-available polymer supports having a sulfonic acid group include styrene polymers such as Amberlyst 15 available from Organo Corporation and Daiaion PK228 available from Mitsubishi Chemical Corporation, styrene-divinylbenzene copolymers such as MSC-1 available from Muromachi Technos Co., Ltd., and fluorocarbon resins such as Nafion-NR50 and Nafion-SAC13 available from Du Pont, which can be used in the reaction of the invention.

Reaction Mixture

The epoxidation can be carried out in the presence of one or more organic solvents (organic phase) and/or in an aqueous medium.

In one embodiment, the unsaturated polymer is provided in an organic phase. The hydrogen peroxide and the polymer support having a sulfonic acid group are provided in an aqueous phase. In one embodiment, the organic phase is added into the aqueous phase. In one embodiment, the aqueous phase is added into the organic phase.

The solvents useful in the organic phase are C4 to C10 aliphatic, cyclic, alicyclic and/or C6 to C10 aromatic hydrocarbons, halo derivatives of aliphatic, cyclic, alicyclic and aromatic hydrocarbons, ethers, glycol ethers, alkyl esters or combinations thereof. Non-limiting examples of the organic solvents are C4-C8 straight or branched chain alkanes and C4-C10 cycloalkanes.

Non-limiting examples of C4-C8 straight or branched chain alkanes and their halo derivatives are pentane, hexane, heptane, isobutene, 2-methylpentane, dichloromethane, chloroform, etc. Non-limiting examples of optionally substituted cylcoalkanes are cyclohexane, methylcyclohexane and ethylcyclohexane, etc. Non-limiting examples of aromatic hydrocarbons and their halo derivatives are benzene, toluene, xylene, chlorobenzene, etc. Non-limiting examples of ethers are dimethyl ether, diethyl ether, tetrahydofuran, dioxane, etc.

The amount of organic solvent can for example, be from 20 to 10,000 parts by weight, preferably from 50 to 500 parts by weight, based on 100 parts by weight of unsaturated polymer.

Hydrogen peroxide solution is used in a concentration in water of about 5 to 70% by weight. In one embodiment the hydrogen peroxide solution comprises hydrogen peroxide content of 30 to 70% by weight.

The hydrogen peroxide is used in at least stoichiometric amounts based on the unsaturation (i.e., number of the double bonds to be epoxidized) of the unsaturated polymer. In one embodiment, hydrogen peroxide is used in excess. In one embodiment, the hydrogen peroxide is used up to 50 molar equivalents to the unsaturation.

The amount of the sulfonic acid group is generally 0.00001 to 15 equivalents. In one embodiment, the amount of sulfonic acid group is about 0.001 to 15 equivalents, per unsaturation of the unsaturated polymer. In one embodiment, the amount of sulfonic acid group is about 0.1 to 15 equivalents of unsaturated double bond of the unsaturated polymer.

In order to avoid a possible degradation of the epoxidized polymer, at least one stabilizing agent can be added to the reaction mixture, and/or during purification of the epoxidized polymer. Non-limiting examples of the stabilizing agent are sterically hindered phenols, sterically hindered amines (HALS), amine derivatives, dihydroquinoline derivatives, or mixtures thereof.

Non-limiting examples of sterically hindered phenols are: tetrakis [3-(3,5-di-t-butyl-4-hydroxyphenyl)propionyloxymethyl]methane (Irganox® 1010 from Ciba Geigy or Anox® 20 from Great Lakes), octadecyl-3-(3',5'-di-t-butyl-4'-hydroxyphenyl)-propionate (Irganox 1076 from Ciba Geigy or Anox PP18 from Great Lakes), 1,3,5-trimethyl-2, 4,6-tris(3,5-di-t-butyl-4-hydroxybenzyl) benzene (Irganox 1330 from Ciba Geigy), or mixtures thereof.

In one embodiment, the sterically hindered amines are: bis(2,2,6,6-tetramethyl-4-piperidyl) sebacate (Tinuvin® 770 from Ciba Geigy or Uvaseb® 770 from Great Lakes), poly(N-(3-hydroxyethyl)-2,2,6,6-tetramethyl-4-hydroxy-piperidylsuccinate (Tinuvin® 622 from Ciba Geigy) or mixtures thereof.

Non-limiting examples of amine derivatives are: N-isopropyl-N'-phenyl-p-phenylenediamine (IPPD), N-(1,3-dimethylbutyl)-N'-p-phenylenediamine (6PPD), N,N-bis(1,4-dimethylpentyl)-p-phenylenediamine (77PD), N,N'-bis(1-ethyl-3-methylpentyl)-p-phenyldiamine (DOPD), N,N'-diphenyl-p-phenylenediamine (DPPD), N,N'-ditolyl-p-phenylenediamine (DTPD), N,N'-di-β-naphthyl-p-phenylenediamine (DNPD), phenyl-α-naphthylamine (PAN) and phenyl-β-naphthylamine (PBN), or mixtures thereof.

Non-limiting examples of dihydroquinoline derivatives are: 2,2,4-trimethyldihydroquinoline, 6-ethoxy-2,2,4-trimethyl-1,2-dihydroquinoline (ETMQ), or mixtures thereof.

Reaction Conditions

The organic phase comprising unsaturated polymers can be used directly without any pretreatment. The organic phase can also be pretreated to remove foreign materials, such as calcium stearate, prior to contacting the organic phase with the aqueous phase. In one embodiment, the pretreatment comprises centrifugation of the organic phase comprising the unsaturated polymer.

The organic and aqueous phases are allowed to react from about 24 hours to 72 hours. In one embodiment, the two phases are allowed to react for about 48 hours.

The process of the invention can be carried out at a temperature from about 25° C. to about 100° C. In one embodiment, the reaction temperature is from about 45° C. to about 80° C. In one embodiment, the reaction temperature is about 60° C.

The epoxidized polymer can be purified by separating the organic phase and the aqueous phase, followed by washing the organic phase with an alkaline solution to maintain the pH in an alkaline region (i.e., pH about 8-10). Washing the organic phase with the alkaline solution removes the unreacted hydrogen peroxide from the epoxidized product. In one embodiment, the organic phase is washed with water and an alkali metal hydroxide (such as NaOH, KOH, etc.). In one embodiment, the organic phase is washed with deionized water along with alkali metal hydroxide.

In one embodiment, the purification step involves adding the stabilizing agent after washing with alkaline solution.

The purified product can be obtained by evaporating the organic solvent and drying the product. The evaporation and drying steps can be achieved, for example, by steam stripping and dry milling process or ethanol coagulation followed by either vacuum over drying at room temperature or heating at about 30° C. to 50° C.

The polymer support having a sulfonic acid group used in the reaction can be easily separated from the reaction mixture and the recovered polymer support may be repeatedly used as is.

The present invention can be considered as "green" chemistry as the only by-product is $H_2O$ and the polymer support having the sulfonic acid group can, in theory, be recovered and reused in subsequent reactions. Using this simple, clean, inexpensive, metal-free process, new functionalized butyl products were successfully prepared for the first time, namely the epoxidized butyl rubber having high isoprene content, with varying degrees of oxirane functionality. In addition, novel products such as epoxidized bromobutyl and chlorobutyl can be synthesized using the same process.

In addition, the oxidation reaction can be controlled in the laboratory conditions to produce new products, namely the epoxidized high isoprene butyl rubber with different degrees of oxirane functionality (30, 55 & 80%).

As discussed previously, using the tri-phasic conditions, it has been demonstrated that small molecules containing double bonds are readily converted to the diols (US 20050096480A1). It was assumed, as such, that the reaction pathway would occur in a similar manner with larger unsaturated molecules. The present application has unexpectedly demonstrated that, in case of larger unsaturated molecules, novel epoxides can be obtained, wherein the formation of the expected diols were inhibited.

In one aspect, the present invention is directed to novel epoxidized halogenated-polymer comprising:
a) repeating units derived from at least one isoolefin monomer;
b) repeating units derived from at least one diolefinic monomer,
wherein the epoxidized halogenated-polymer comprises one or more allylic halide groups and one or more oxirane functional groups in the polymer backbone.

In one embodiment of the epoxidized halogenated-polymer, the halogenated-polymer is halobutyl rubber. In one embodiment of the epoxidized halobutyl rubber, the halobutyl rubber is bromobutyl rubber or chlorobutyl rubber.

The inventors of the present application have established that in the epoxidation of halogenated-polymer, such as halobutyl rubber, surprisingly the only unsaturation group that undergoes the oxidation reaction to form the oxirane is the 1,4-isoprene moiety (Scheme 1), and that the allylic halide moieties are not affected, thereby leading to novel epoxy halogenated-polymers.

Scheme 1: Epoxidation of Halobutyl

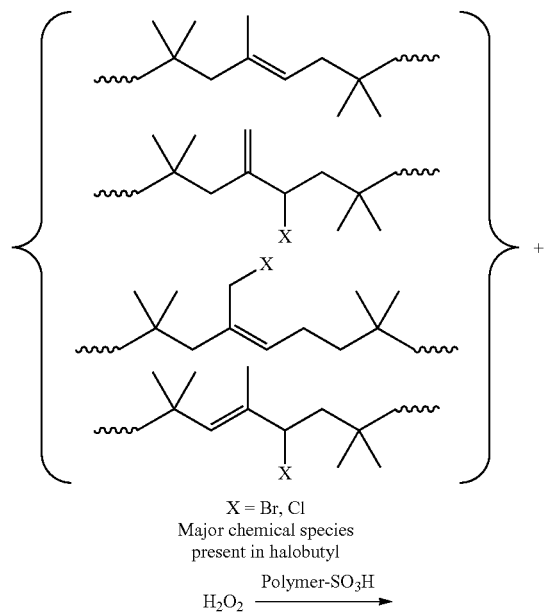

X = Br, Cl
Major chemical species present in halobutyl $\xrightarrow{\text{Polymer-SO}_3\text{H}}_{\text{H}_2\text{O}_2}$

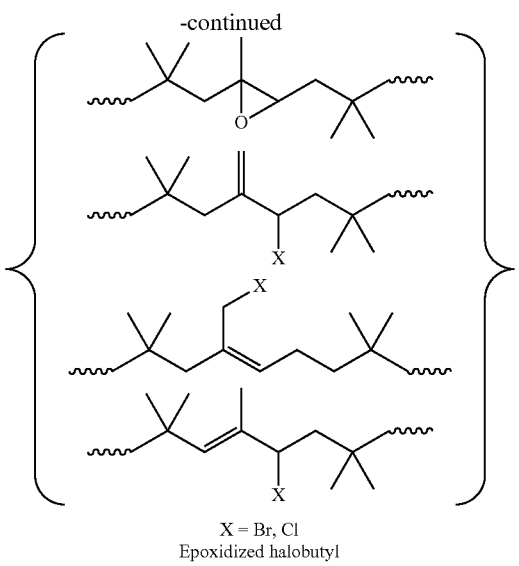

X = Br, Cl
Epoxidized halobutyl

The epoxy halogenated-polymers can be prepared by epoxidising a halogenated-polymer comprising allylic halide groups and ethylene groups as the polymer backbone, under the conventional epoxidation methods such as using formic acid & hydrogen peroxide, as well using $SO_3H$-polymer support & hydrogen peroxide as described in the present application.

It has also been found that the epoxidized halobutyl rubber (comprising allylic bromide groups and the oxirane groups in the polymer backbone) exhibit lower permeability than the halobutyl rubber analogues (see example vulcanization of bromobutyl rubber and epoxidized bromobutyl rubber). The epoxidized halobutyl rubber can therefore be used for air and moisture barrier applications such as tire innerliner and pharma rubber closure.

The invention will now be described with reference to specific examples. It will be understood that the following examples are intended to describe embodiments of the invention and are not intended to limit the invention in any way.

Example 1: Epoxidation of Regular Butyl (LANXESS Butyl 301)

The epoxidation experiment was carried out in a batch process in a fully baffled 5 L round bottom flask. The 3-necked top lid was connected to an overhead mechanical stirrer using a glass stir rod and a Teflon paddle, and a water cooled reflux condenser. 100 g (0.0299 mol of C=C) of LANXESS Butyl 301 (1.85 mol % unsaturation) sample was cut into small pieces and dissolved in 2 L of hexane to produce a rubber solution of approx. 7 wt % solid. The butyl solution was then subjected to centrifugation (15,000 rpm) to remove foreign materials prior to use. Prior to adding the butyl polymer hexane solution to the reaction flask, 111.5 g (0.99 mol) of $H_2O_2$ (30 wt % aqueous solution) was allowed to react with 25 g (ca. 0.1175 mol of $SO_3H$) of Amberlyst 15 at room temperature for 10-15 minutes. The butyl polymer hexane solution was then added to this mixture and allowed to react at 60° C. via a temperature controlled oil bath with periodic sampling to monitor the reaction progress. After reaching the desired levels of epoxidation, the reaction mixture was then subjected to subsequent work-up. The following general work-up steps were found to be the most convenient and effective to obtain the epoxidized product in quantitative yields:
1) add fresh deionized water (approximately 1000 ml) to the reaction mixture to promote phase separation.
2) remove the aqueous phase containing Amberlyst 15
3) wash the hexane phase with several portions of fresh deionized water (approx. 700-1000 ml each) along with caustic solution to maintain the pH within the neutral to the alkaline region (ca pH 7-10).
4) add approx. 1 phr of antioxidant (Irganox 1076)
5) apply steam to strip off the hexane and dry on a hot mill to obtain finished product.

The resulting sample was analyzed by $^1$H-NMR and GPC.

Example 2: Epoxidation of High Isoprene Butyl Rubber Via Process of the Present Invention Same experimental set up as in Example 1. 100 g (0.1196 mol of C═C) of the high isoprene butyl rubber (7.46 mol % unsauration) sample was cut into small pieces and dissolved in 2 L of hexane to produce a rubber solution of approx. 7 wt % solid. The butyl solution was then subjected to centrifugation (15,000 rpm) to remove foreign materials prior to use. Prior to adding the butyl polymer hexane solution to the reaction flask, 111.5 g (0.99 mol) of $H_2O_2$ (30 wt % aqueous solution) was allowed to react with 25 g (ca. 0.1175 mol of $SO_3H$) of Amberlyst 15 at room temperature for 10-15 minutes. The butyl polymer hexane solution was then added to this mixture and allowed to react at 60° C. via a temperature controlled oil bath with periodic sampling to monitor the reaction progress. The work up procedure was the same as in Example 1.

The resulting sample was analyzed by $^1$H-NMR and GPC.

Example 3: Preparation of Epoxidized Bromobutyl by Epoxidation of Bromobutyl Rubber (LANXESS Bromobutyl 2030) Via Process of the Present Invention Same experimental set up as in Example 1. 42 g (0.0116 mol of C═C) of LANXESS Bromobutyl 2030 sample (0.72 mol % unsauration) was cut into small pieces and dissolved in 600 mL of hexane to produce a rubber solution of approx. 9.5 wt % solid. The butyl solution was then subjected to centrifugation (15,000 rpm) to remove foreign materials prior to use. Prior to adding the butyl polymer hexane solution to the reaction flask, 3.5 g (0.0311 mol) of $H_2O_2$ (30 wt % aqueous solution) was allowed to react with 10 g (ca. 0.0470 mol) of Amberlyst 15 at room temperature for 10-15 minutes. The butyl polymer hexane solution was then added to this mixture and allowed to react at 60° C. via a temperature controlled oil bath with periodic sampling to monitor the reaction progress. The work up procedure was the same as in Example 1.

The resulting sample was analyzed by $^1$H-NMR and GPC.

Example 4: Preparation of Epoxidized Chlorobutyl by Epoxidation of Chlorobutyl Rubber (LANXESS Chlorobutyl 1240) Via Process of the Present Invention Same experimental set up as in Example 1. 125 g (0.0115 mol of C═C) of LANXESS Chlorobutyl 1240 sample (0.57 mol % unsauration) was cut into small pieces and dissolved in 2 L of hexane to produce a rubber solution of approx. 8.5 wt % solid. The butyl solution was then subjected to centrifugation (15,000 rpm) to remove foreign materials prior to use. Prior to adding the butyl polymer hexane solution to the reaction flask, 10 g (0.0888 mol) of $H_2O_2$ (30 wt % aqueous solution) was allowed to react with 30 g (0.1410 mol) of Amberlyst 15 at room temperature for 10-15 minutes. The butyl polymer hexane solution was then added to this mixture and allowed to react at 60° C. via a temperature controlled oil bath with periodic sampling to monitor the reaction progress. The work up procedure was the same as in Example 1.

The resulting sample was analyzed by $^1$H-NMR and GPC.

Example 5: Preparation of Epoxidized Bromobutyl by Epoxidation of Bromobutyl Rubber (LANXESS Bromobutyl 2030) Via Conventional Epoxidation Method The epoxidation experiment was carried out in a batch process in a fully baffled 2 L round bottom flask with a magnetic stir bar. 57 g (0.0073 mol of C═C) of LANXESS Bromobutyl 2030 sample was cut into small pieces and dissolved in 800 mL of hexane to produce a rubber solution of approx. 9.5 wt % solid. The butyl rubber solution was then subjected to centrifugation (15,000 rpm) to remove foreign materials and then transferred to the reaction flask. 1.4 g (0.0124 mol) of $H_2O_2$ (30 wt % aqueous solution) and 0.6 g (ca. 0.0111 mol) of formic acid (85% concentration) were added to the reaction flask containing the butyl rubber solution at room temperature. An aliquot was taken from the reaction mixture periodically to monitor the reaction progress. Upon completion of the reaction, the following work-up steps were carried out to obtain the epoxidized product in quantitative yields:
1) wash the reaction mixture with several portions of fresh deionized water (approx. 500-800 ml each) along with caustic solution to maintain the pH within the neutral to the alkaline region (ca pH 7-10).
2) add approx. 1 phr of antioxidant (Irganox 1076)
3) apply steam to strip off the hexane and dry on a hot mill to obtain finished product.

The resulting sample was analyzed by $^1$H-NMR and GPC.

Example 6: Preparation of Epoxidized Bromobutyl by Epoxidation Chlorobutyl Rubber (LANXESS Chlorobutyl 1240) Via Conventional Epoxidation Method The epoxidation experiment was carried out in a batch process in a fully baffled 2 L round bottom flask. The 3-necked top lid was connected to an overhead mechanical stirrer using a glass stir rod and a Teflon paddle. 150 g (0.0152 mol of C═C) of LANXESS Chlorobutyl 1240 sample was cut into small pieces and dissolved in 2.5 L of hexane to produce a rubber solution of approx. 8.2 wt % solid. The butyl rubber solution was then subjected to centrifugation (15,000 rpm) to remove foreign materials and then transferred to the reaction flask. 5 g (0.0441 mol) of $H_2O_2$ (30 wt % aqueous solution) and 3 g (ca. 0.0554 mol) of formic acid (85% concentration) were added to the reaction flask containing the butyl rubber solution at room temperature. An aliquot was taken from the reaction mixture periodically to monitor the reaction progress. Upon completion of the reaction, the following work-up steps were carried out to obtain the epoxidized product in quantitative yields:

1) wash the reaction mixture with several portions of fresh deionized water (approx. 500-800 ml each) along with caustic solution to maintain the pH within the neutral to the alkaline region (ca pH 7-10).
2) add approx. 1 phr of antioxidant (Irganox 1076)
3) apply steam to strip off the hexane and dry on a hot mill to obtain finished product.

The resulting sample was analyzed.

Example 7: Vulcanization of Bromobutyl and the Epoxidized Bromobutyl

A sample of LANXESS BB2030 and the corresponding epoxidized bromobutyl from Example 3 were used in this study. Both samples were compounded in a Brabender mixer using the following cure recipe:

|  | phr |
|---|---|
| Bromobutyl or epoxidized bromobutyl rubber | 100 |
| CARBON BLACK | 40 |
| Stearic Acid | 1.0 |
| Zinc Oxide | 5.0 |

Test samples were compression molded in a curing press and vulcanized at 160° C. Cure times were set by using the MDR T90 time+5 minutes. Typical thickness of the compression-molded sheets was 0.5 mm. Disks 48 mm in diameter were punched out from the molded sheets for permeability testing. The oxygen permeation measurements were performed using a Mocon OX-TRAN 2/61 permeability tester at 40° C. and 0% relative humidity. A steady flow of oxygen at 10 ml/min was maintained on one side of the disk, while a steady flow of nitrogen at 10 ml/min was maintained on the other side of the disk. Using the oxygen sensor on the nitrogen side, the increase in oxygen concentration on the nitrogen side with time could be monitored. The samples were conditioned for 10 hours under constant oxygen flow at 40° C., then the oxygen transmission rate was measured until a constant value was reached. Data is reported as an oxygen permeation rate (OPR) in cc·mm/($m^2$·day). OPR is the transmission rate normalized for sample thickness and is expressed as volume (cc) of gas per unit area of sample ($m^2$) in a discreet unit of time (1 day). Permeability test results are provided in Table 1.

TABLE 1

Permeability test results

| Sample | Thickness (mm) | Temperature (° C.) | Permeability Rate cc · mm/($m^2$ · day) |
|---|---|---|---|
| Bromobutyl vulcanizate - sample 1 | 0.450 | 39.9 | 155.15 |
| Epoxidized bromobutyl vulcanizate - sample 1 | 0.447 | 39.9 | 140.31 |
| Bromobutyl vulcanizate - sample 2 | 0.504 | 39.9 | 145.90 |
| Epoxidized bromobutyl vulcanizate - sample 2 | 0.522 | 39.9 | 132.19 |

All documents cited in the Detailed Description of the invention are, in relevant part, incorporated herein by reference; the citation of any document is not to be construed as an admission that it is prior art with respect to the present invention.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What we claim is:

1. A process for epoxidizing 1,4 isoprene moieties of halobutyl rubber comprising unsaturated allylic halide moieties and unsaturated 1,4-isoprene moieties, the process comprising reacting an unsaturated halobutyl rubber with hydrogen peroxide in the presence of a polymer support having a sulfonic acid group, to epoxidize only the unsaturated 1,4-isoprene moieties of the halobutyl rubber without affecting the allylic halide moieties of the halobutyl rubber to produce epoxidized halobutyl rubber comprising allylic halide groups and oxirane functional groups in the polymer backbone.

2. The process according to claim 1, wherein:
the unsaturated halobutyl rubber is in an organic phase,
both the hydrogen peroxide and the polymer support are together in an aqueous phase, and
the reacting comprises mixing the organic phase and the aqueous phase for reaction of the unsaturated halobutyl rubber with the hydrogen peroxide in the presence of the polymer support.

3. The process according to claim 1, wherein the organic phase comprises at least one solvent selected from aliphatic hydrocarbon, cyclic hydrocarbon, alicyclic hydrocarbon, aromatic hydrocarbon, halo derivatives of aliphatic, cyclic, alicyclic or aromatic hydrocarbons, ethers, glycol ethers, alkyl esters and combinations thereof.

4. The process according to claim 1, wherein the polymer support is a styrene polymer.

5. The process according to claim 1, wherein the polymer support is a styrene-divinylbenzene copolymer.

6. The process according to claim 1, wherein the polymer support is a fluorocarbon resin.

7. The process according to claim 1, wherein the process is carried out at a temperature of about 25° C. to about 100° C.

8. The process according to claim 1, wherein the process comprises reacting the unsaturated halobutyl rubber with about 1 to about 50 molar equivalents of hydrogen peroxide relative to the number of the double bonds of the unsaturated polymer to be epoxidized.

9. The process according to claim 1, wherein the process comprises reacting the unsaturated halobutyl rubber with hydrogen peroxide in the presence of a polymer support having about 0.00001 to 15 molar equivalents of the sulfonic acid groups relative to the number of the double bonds of the unsaturated polymer to be epoxidized.

10. The process according to claim 1, further comprising pretreating the unsaturated halobutyl rubber to remove foreign materials prior to reacting the unsaturated halobutyl rubber with the hydrogen peroxide and the sulfonic acid group.

11. The process according to claim 10, wherein the pretreating comprises centrifugation.

12. The process according to claim 2, further comprising separating the organic phase and the aqueous phase.

13. The process according to claim 12, further comprising washing the organic phase with an alkaline solution to maintain the pH in an alkaline region.

14. The process according to claim 13, further comprising removing organic solvent from the organic phase.

15. The process according to claim 14, further comprising removing the organic solvent by applying steam or by ethanol coagulation.

16. The process according to claim 1, wherein the unsaturated halobutyl rubber, hydrogen peroxide, and polymer support are mixed together to produce a reaction mixture and the process further comprises adding a stabilizing agent to the reaction mixture.

17. The process according to claim 13, further comprising adding a stabilizing agent subsequent to washing the organic phase with an alkaline solution.

18. The process of claim 17, wherein the stabilizing agent is sterically hindered phenol, sterically hindered amine (HALS), amine derivative, dihydroquinoline derivative, or mixtures thereof.

19. The process according to claim 1, wherein:
the polymer support is at least one of a styrene polymer, a styrene-divinylbenzene copolymer, and a fluorocarbon resin;
the unsaturated halobutyl rubber is in an organic phase, and both the hydrogen peroxide and the polymer support are in an aqueous phase; and
the process further comprises:
pretreating the unsaturated halobutyl rubber to remove foreign materials;
reacting the unsaturated butyl rubber with about 1 to about 50 molar equivalents of hydrogen peroxide relative to the number of the double bonds of the unsaturated polymer to be epoxidized, in the presence of a polymer support having about 0.00001 to 15 molar equivalents of the sulfonic acid groups relative to the number of the double bonds of the unsaturated polymer to be epoxidized, wherein the reacting comprises mixing the organic phase containing the unsaturated halobutyl rubber with the aqueous phase containing the hydrogen peroxide and polymer support;
separating the resultant aqueous phase from the resultant organic phase containing organic solvent and the epoxidized polymer;
washing the organic phase with an alkaline solution to maintain a pH of the organic phase in an alkaline region;
adding a stabilizing agent to the washed organic phase, wherein the stabilizing agent is sterically hindered phenol, sterically hindered amine (HALS), amine derivative, dihydroquinoline derivative, or mixtures thereof; and
evaporating the organic solvent from the organic phase.

20. The process according to claim 2, comprising one of:
adding the organic phase into the aqueous phase, or
adding the aqueous phase into the organic phase,
to react the unsaturated halobutyl rubber with the hydrogen peroxide in the presence of the polymer support.

* * * * *